(12) United States Patent
Sehgal et al.

(10) Patent No.: US 12,487,757 B2
(45) Date of Patent: Dec. 2, 2025

(54) USING A PERSISTENT BYTE-ADDRESSABLE MEMORY IN A COMPUTE EXPRESS LINK (CXL) MEMORY DEVICE FOR EFFICIENT POWER LOSS RECOVERY

(71) Applicant: MICRON TECHNOLOGY, INC., Boise, ID (US)

(72) Inventors: Rohit Sehgal, San Jose, CA (US); Vishal Tanna, Santa Clara, CA (US); Eishan Mirakhur, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/587,865

(22) Filed: Feb. 26, 2024

(65) Prior Publication Data

US 2024/0311019 A1    Sep. 19, 2024

Related U.S. Application Data

(60) Provisional application No. 63/452,070, filed on Mar. 14, 2023.

(51) Int. Cl.
   *G06F 3/06*            (2006.01)
(52) U.S. Cl.
   CPC .......... *G06F 3/0619* (2013.01); *G06F 3/0659* (2013.01); *G06F 3/0679* (2013.01)
(58) Field of Classification Search
   CPC .... G06F 3/0619; G06F 3/0659; G06F 3/0679; G06F 3/061; G06F 3/064; G06F 3/0688

USPC .................................................. 711/103, 102
See application file for complete search history.

(56) References Cited

U.S. PATENT DOCUMENTS

| | | | |
|---|---|---|---|
| 2014/0068235 A1* | 3/2014 | Nightingale | G06F 9/44573 713/1 |
| 2021/0149821 A1* | 5/2021 | Cui | G06F 12/1036 |
| 2023/0195372 A1* | 6/2023 | Kachare | G06F 3/061 711/154 |
| 2023/0418516 A1* | 12/2023 | Weiss | G06F 3/0656 |

* cited by examiner

*Primary Examiner* — Hosain T Alam
*Assistant Examiner* — Zubair Ahmed
(74) *Attorney, Agent, or Firm* — Lowenstein Sandler LLP

(57) ABSTRACT

A system can include a first memory device including a persistent byte-addressable memory; a second memory device; and a processing device, operatively coupled with the first and second memory devices, to perform operations including: receiving a first host command to write or read user data; storing the user data in the persistent byte-addressable memory with a first data granularity; and transmitting the user data stored in the persistent byte-addressable memory to the second memory device. The operations can further include: responsive to determining that a power loss event has occurred during an operation to a particular data packet in a size of the first data granularity in the persistent byte-addressable memory, determining whether the first host command associated with the particular data packet is completely executed; and responsive to determining that the first host command is not completely executed, restoring the particular data packet in the persistent byte-addressable memory.

20 Claims, 6 Drawing Sheets

USING A PERSISTENT BYTE-ADDRESSABLE MEMORY IN A COMPUTE EXPRESS LINK (CXL) MEMORY DEVICE FOR EFFICIENT POWER LOSS RECOVERY

TECHNICAL FIELD

This application claims the benefit of U.S. Provisional Patent Application No. 63/452,070, filed Mar. 14, 2023, the entire contents of which are incorporated by reference herein.

Embodiments of the disclosure relate generally to memory sub-systems, and more specifically, relate to using a persistent byte-addressable memory in a compute express link (CXL) memory device for efficient power loss recovery.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
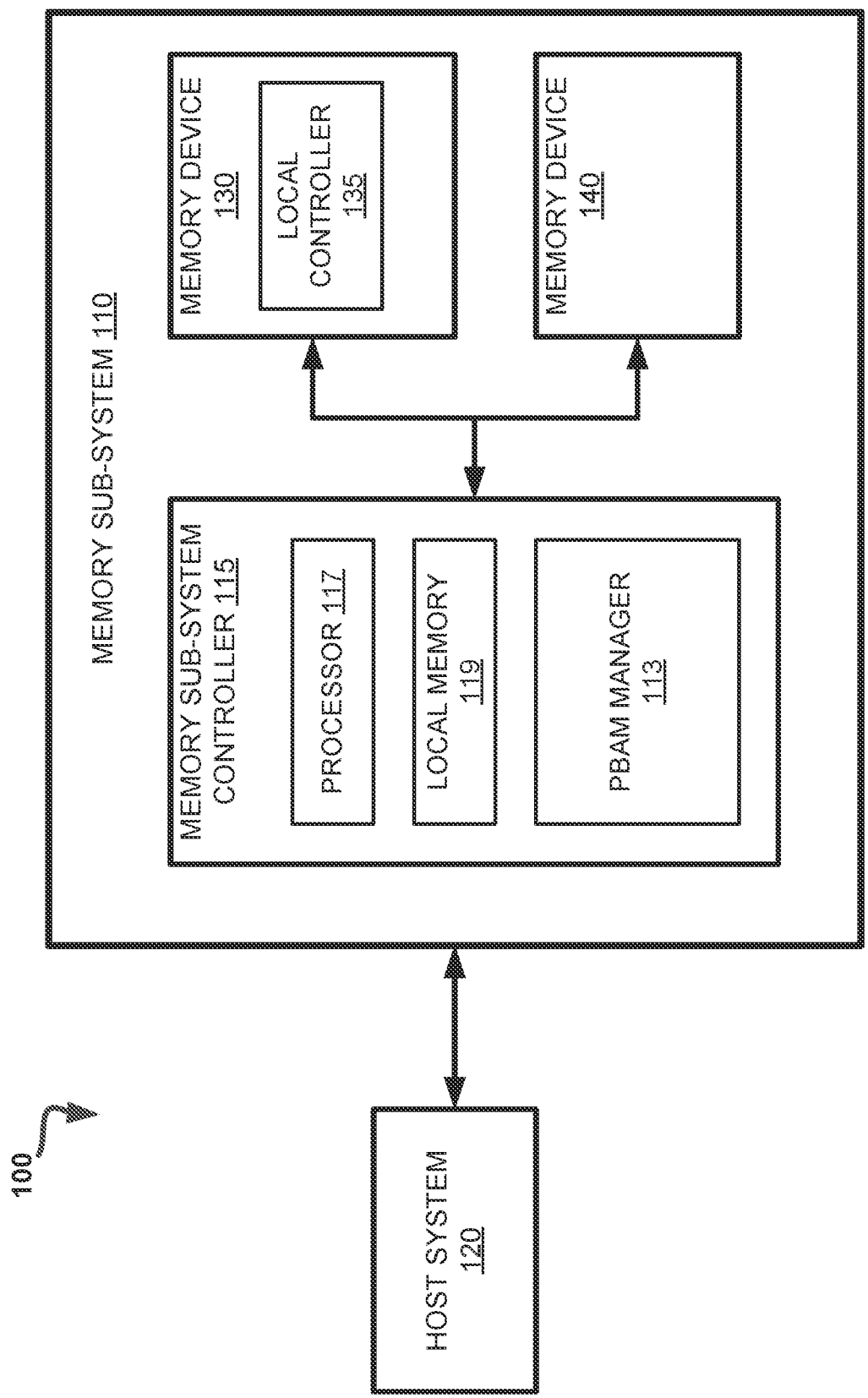
FIG. 1 illustrates an example computing system that includes a memory sub-system in accordance with some embodiments of the present disclosure.

Aspects of the present disclosure are directed to using a persistent byte-addressable memory in a compute express link (CXL) memory device for efficient power loss recovery. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include a two-dimensional or three-dimensional grid of memory cells, which are formed onto a silicon wafer in an array of columns and rows. A block hereinafter refers to a unit of the memory device used to store data and can include a group of memory cells that are electrically coupled to one or more conductive lines referred to as access lines or "wordlines." One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

In systems that utilize memory devices, there can be a delay between the time that data is sent to be stored and the time that the data actually gets recorded on the medium of the memory device. Similarly, there can be a delay between the time that data is requested to be retrieved from the memory device and the time it is actually received by the requesting component. This often occurs due to the data having to pass through other components of the system before arriving at its destination and due to the latency of the read and write operations being executed on the medium of the memory device. As a result of this delay, it is possible that a system or a memory device in a system may experience a power loss event, such as an asynchronous power loss (APL) event, while there is still data that has been either requested or transmitted through components of the system or pending in a component to be written or retrieved when the power loss occurs. Some approaches simply deemed this so-called "in flight" data to be lost, in many cases, irretrievably. However, memory devices that include non-volatile media allow for the possibility of in-flight data being saved before power is completely lost in a computing system.

In the event of power loss, the memory device can perform an emergency system operation, in which a component of a system detects a sudden drop of the power supply voltage and sends a notification across the system before the power supply is completely compromised due to the APL event. In such case, some systems with non-volatile media devices can include capacitors that can provide power to the components of the system when the primary source of power is lost. However, capacitor size and energy storage capacity are very limited in many cases. Moreover, the power provided by a capacitor can often need to be distributed and shared among many components to provide power for their operation when such a power loss event occurs. Because the capacitors often have very limited power-sustaining time, some components of the system and some of their respective operations may need to be prioritized during a power loss event to use the available power-sustaining time efficiently.

Notably, if a power loss event occurs while there is data in-flight and that data is not saved in a non-volatile medium or securely retrieved by another component before complete power loss, the data can be lost. Saving such data may require a sufficient power-sustaining time to permit the system to complete the pending operations. In addition, when a host system writes certain data to a memory device, for example, to open blocks configured as single level cell (SLC) memory while the power loss event occurs, the size of data that needs to be error-corrected or recovered is usually large. Power loss recovery for such a large amount of data can be time-consuming and a waste of computing resources.

Aspects of the present disclosure address the above and other deficiencies by using a persistent byte-addressable memory (PBAM) in a compute express link (CXL) memory device for efficient power loss recovery. The PBAM is a non-volatile memory that can be exposed to a host system, i.e., the address of the PBAM is directly accessible by the host system. The data granularity of PBAM can be smaller than that of a traditional non-volatile memory, i.e., data that is written to or read from the PBAM can be packaged in a small size (e.g., 64 byte) packet, and the data writing or reading is performed packet by packet, which is smaller than a packet size (e.g., 16 KB) of a traditional non-volatile memory. The PBAM would serve as an intermediate layer for storing user data in a CXL memory device, where the user data can be transferred from the PBAM to a recipient memory as instructed by the host system or for use by the host system. The CXL memory device is a memory device (e.g., type 3 CXL memory device) that the host system can use as a memory buffer for memory bandwidth expansion, memory capacity expansion, and persistent memory applications. CXL is an interface standard that can support a number of protocols that can run on top of peripheral component interconnect express (PCIe), including a CXL.io protocol and a CXL.mem protocol. The CXL.io protocol is a PCIe-like protocol that can be viewed as an "enhanced" PCIe protocol capable of carving out managed memory, and can provide an interface for I/O devices. The CXL.mem protocol can enable host access to the memory of an attached device using memory semantics (e.g., load and store commands), and can support both volatile and persistent memory architectures. The CXL memory device can provide support for at least the CXL.io protocol and the CXL.mem protocol.

In some implementations, the CXL memory device provides a non-volatile memory device alongside the PBAM. The host system can send, to the CXL memory device, a non-volatile memory express (NVMe) write command, via a CXL.io protocol. A controller of the CXL memory device can store user data associated with the NVMe write command to the PBAM with a small data granularity. Specifically, the user data is packaged in small size (e.g., 64 byte) packets, and the controller of the CXL memory device stores the user data packet by packet. When a power loss event occurs during storing the user data in the PBAM, the controller of the CXL memory device can either finish the data transfer by using the capacitor due to the small size of the in-flight data packet, or the controller of the CXL memory device can, upon power up, receive the data packet again from the host system because the host system has not received a notification for successfully storing the data packet and thus resend the data packet, which is in a small size. While the controller of the CXL memory device is storing the user data in the PBAM, the controller of the CXL memory device can start to move the user data stored in the PBAM to the non-volatile memory device specified in the NVMe write command. A power loss event that occurs during the movement of user data from the PBAM to the non-volatile memory would not affect the interaction with the host system because the PBAM is a non-volatile memory, and the controller of the CXL memory device can, without any loss of data, resume the movement of the user data when power returns. Once the controller of the CXL memory device has moved all user data associated with the NVMe command to the non-volatile memory, the controller of the CXL memory device can free the memory space used for storing the user data in the PBAM for other uses.

In some implementations, the CXL memory device provides a non-volatile memory alongside the PBAM. The host system can send, to the CXL memory device, a non-volatile memory express (NVMe) read command, via a CXL.io protocol. A controller of the CXL memory device can obtain the user data from the non-volatile memory specified in the NVMe read command and send the user data to the host system. Alternatively, the controller of the CXL memory device can obtain the user data from the non-volatile memory specified in the NVMe read command and store user data to the PBAM with a small data granularity as described above. The host system can then read the user data from the PBAM, which is faster than reading the same data from the non-volatile memory.

In some implementations, the host system can send, to the CXL memory device, a CXL.mem write command, via a CXL.mem protocol. A controller of the CXL memory device can store user data associated with the CXL.mem write command to the PBAM with a small data granularity. Specifically, the user data is packaged in small size (e.g., 64 byte) packets, and the controller of the CXL memory device stores the user data packet by packet. When a power loss event occurs during storing the user data in the PBAM, the controller of the CXL memory device can either finish the data transfer by using the capacitor due to the small size of the in-flight data packet, or the controller of the CXL memory device can, upon power up, receive the data packet again from the host system because the host system has not received a notification for successfully storing the data packet and thus resend the data packet, which is in a small size. While the controller of the CXL memory device is storing the user data in the PBAM, the controller of the CXL memory device can receive another host command to use the user data stored in the PBAM. In some implementations, after user data has been stored in the PBAM, the host system can send, to the CXL memory device, a CXL.mem read command, via a CXL.mem protocol. A controller of the CXL memory device can read user data associated with the CXL.mem read command from the PBAM, which is faster than reading the same data from a non-volatile memory.

As such, the PBAM can be used as a transition oriented non-volatile memory, which has a smaller data granularity for writing than that of a traditional non-volatile memory and can provide data read faster than a traditional non-volatile memory.

Advantages of the present disclosure include but are not limited to efficient power loss recovery, by using a small data granularity for writing to reduce the time needed to have power sustained (e.g., by a capacitor) during a power loss event and/or reduce the time needed to boot up for an efficient restoration of the system upon a power up following a power loss event. Specifically, the system significantly improves in FLGP (find last good page) algorithm performance as the system only needs to scan the last pages of the PBAM that are in small size instead of all the open SLC blocks on NAND flash memory. The system also significantly reduces data loss impact because of the small data granularity of the PBAM. Further, using the PBAM in the CXL memory device provides a quick access to the data stored in the PBAM.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The NVMe interface is a communications interface/protocol developed for SSDs to operate over a host and a memory device that are linked over a PCIe interface. The NVMe protocol provides a command queue and completion path for access of data stored in memory devices by host system 220. In some embodiments, the interface between the host system and the memory device can implement one or more alternate protocols supported by another interface standard. For example, the interface can implement one or more alternate protocols supported by PCIe (e.g., non-PCIe protocols). In some embodiments, the interface can be represented by the compute express link (CXL) interface or any communication link that allows cache line granularity updates and shares coherency control with the processing device.

A CXL system is a cache-coherent interconnect for processors, memory expansion, and accelerators. A CXL system maintains memory coherency between the CPU memory space and memory on attached devices, which allows resource sharing for higher performance, reduced software stack complexity, and lower overall system cost. Generally, CXL is an interface standard that can support a number of protocols that can run on top of PCIe, including a CXL.io protocol, a CXL.mem protocol and a CXL.cache protocol. The CXL.io protocol is a PCIe-like protocol that can viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processors.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system 110 includes a PBAM manager 113. In some embodiments, the memory sub-system controller 115 includes at least a portion of the PBAM manager 113. In some embodiments, the PBAM manager 113 is part of the host system 110, an application, or an operating system. In other embodiments, local media controller 135 includes at least a portion of PBAM manager 113 and is configured to perform the functionality described herein. Further details regarding the operations of the PBAM manager 113 are described below with reference to FIGS. 2-6.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
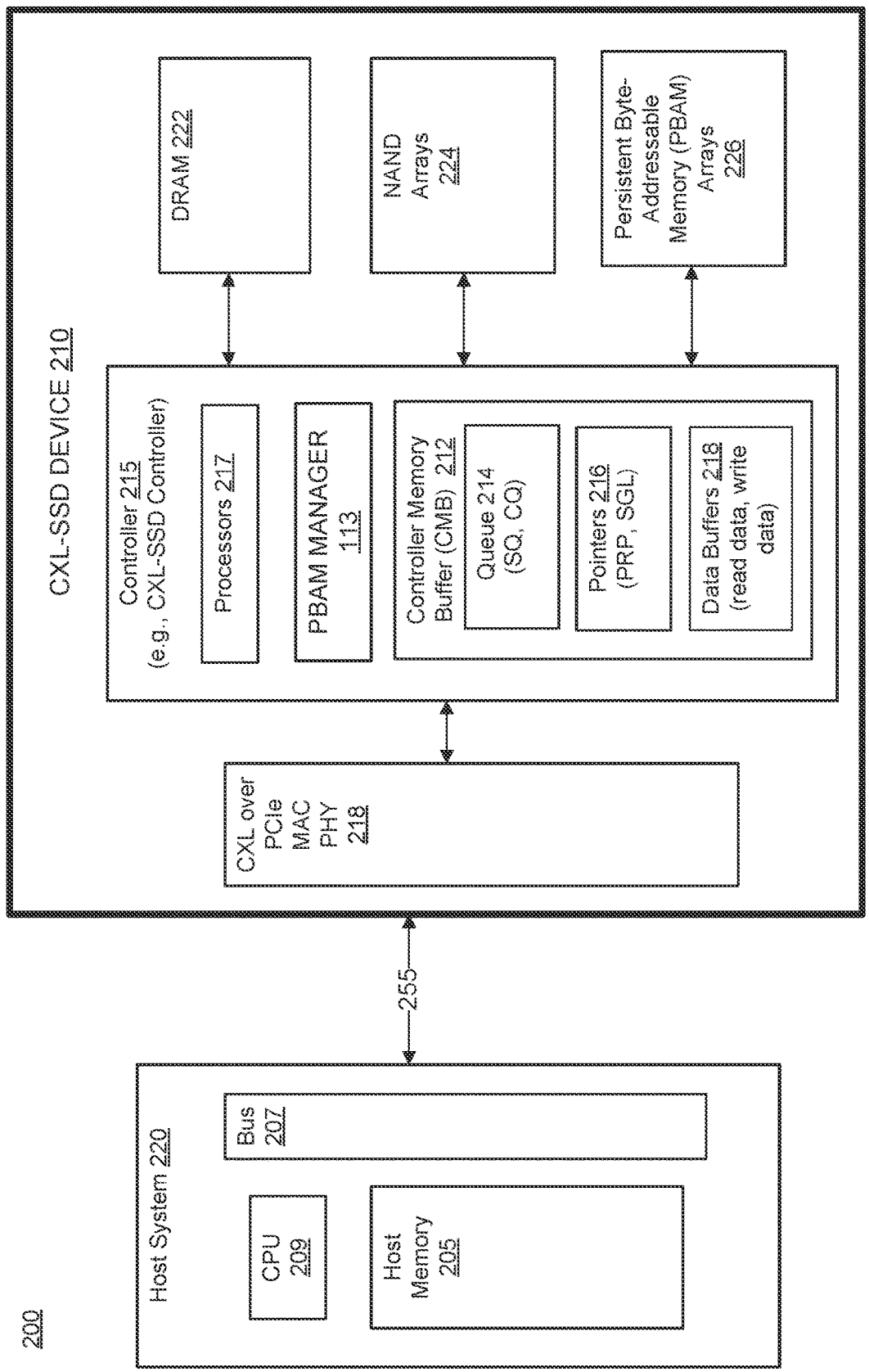
FIG. 2 is a block diagram of an example system for using a persistent byte-addressable memory (PBAM) in a compute express link solid-state drive (CXL-SSD) device for efficient power loss recovery in accordance with some embodiments of the present disclosure.

FIG. 2 is a schematic block diagram of a system 200 implementing a persistent byte-addressable memory (PBAM) in a compute express link (CXL) memory device. In various embodiments, the system 200 includes a host system 220 (such as the host system 120), a CXL-SSD device 210 (e.g., the memory sub-system 110) that includes a controller 215 (e.g., controller 115), NAND arrays 224 (e.g., memory device 130), persistent byte addressable memory (PBAM) arrays 226, and DRAM 222 (e.g., memory device 140). In some embodiments, aspects (to include hardware and/or firmware functionality) of the controller 215 is included in the local media controller 135.

In some embodiments, the host system 220 includes a central processing unit (CPU) 209 connected to a host memory 205, such as DRAM or other main memories. The host system 220 includes a bus 207, such as a memory device interface, which interacts with a host interface 218, via a CXL connection 255.

The CXL connection 255 can include a set of data-transmission lanes ("lanes") for implementing CXL protocols, including CXL.io protocol, CXL.mem protocol, and CXL.cache protocol. The CXL connection 255 can include any suitable number of lanes in accordance with the embodiments described herein. For example, the CXL connection 255 can include 16 lanes (i.e., CXL x16).

The host interface 218 may include media access control (MAC) and physical layer (PHY) components, of CXL-SSD device 210 for ingress of communications from host system 220 to CXL-SSD device 210 and egress of communications from CXL-SSD device 210 to host system 220. Bus 207 and host interface 218 operate under a communication protocol, such as a CXL over PCIe serial communication protocol or other suitable communication protocols. Other suitable communication protocols include Ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols.

CXL-SSD device 210 is a CXL enabled NVMe SSD device. The CXL enabled NVMe SSD device is a memory device that allows the host system 220 to use as a memory buffer for memory bandwidth expansion, memory capacity expansion, and persistent memory applications. The CXL-SSD device 210 can provide support for at least CXL.io protocol and CXL.mem protocol. More specifically, the PBAM 226 can be accessible over CXL.mem protocol and the NAND 224 can be accessible over CXL.io protocol. By using, e.g., CXL.io protocol for the NAND 224 and using, e.g., CXL.mem protocol for the PBAM 226, a single device can be obtained that supports both the NAND 224 and the PBAM 226 that is cacheable and coherent. Since CXL is designed to be low latency, there is negligible added latency (e.g., 25 ns) for the NAND 224. CXL.mem latencies are targeting ~80 ns assuming memory is at double data rate (DDR) speeds. In the embodiment in which the PBAM 226 is visible through CXL.mem protocol, the CXL-SSD device 210 can be implemented within a memory buffer to perform one or more persistent memory applications. In the embodiment in which the NAND 224 is visible through CXL.io protocol, the CXL-SSD device 210 can be implemented within a memory buffer to perform one or more persistent memory applications through the PBAM 226.

CXL-SSD device 210 includes a controller 215 (e.g., processing device) which manages operations of CXL-SSD device 210, such as writes to and reads from NAND 224 and/or PBAM 226. Controller 215 may include one or more processors 217, which may be multi-core processors. Processors 217 can handle or interact with the components of memory device 130 generally through firmware code. Controller 215 may operate under NVM Express (NVMe) or CXL protocol, but other protocols are applicable.

Controller 215 executes computer-readable program code (e.g., software or firmware) executable instructions (herein referred to as "instructions") The instructions may be executed by various components of controller 215, such as processor 217, logic gates, switches, application specific integrated circuits (ASICs), programmable logic controllers, embedded microcontrollers, and other components of controller 215. The instructions executable by the controller 215 for carrying out the embodiments described herein are stored in a non-transitory computer-readable storage medium. In certain embodiments, the instructions are stored in a non-transitory computer readable storage medium of CXL-SSD device 210, such as in a read-only memory (ROM), NAND 224, or PBAM 226. Instructions stored in the CXL-SSD device 210 may be executed without added input or directions from the host system 220. In other embodiments, the instructions are transmitted from the host system 220. The controller 215 is configured with hardware and instructions to perform the various functions described herein and shown in the figures.

Controller 215 can interact with the NAND 224 for read and write operations. Controller 215 can execute the direct memory access (DMA) for data transfers between host system 220 and NAND 224 without involvement from CPU 209. Controller 215 can control the data transfer while activating the control path for fetching commands, posting completion and interrupts, and activating the DMA for the actual data transfer between host system 220 and NAND 224. Controller 215 can have an error correction module to correct the data fetched from the memory arrays in the NAND 224.

In some embodiments, the controller 215 further includes a controller memory buffer (CMB) 212. The CMB 212 is a controller memory space which may span across one or more of the DRAM 222. NAND 224, and/or PBAM 226. The contents in CMB 212 typically do not persist across power cycles, so the controller 215 can rebuild the CMB 212 after the system 200 powers on.

One or more types of data structures defined by the NVMe protocol may be stored in the CMB 212 or may be stored in host memory 205. For example, CXL-SSD device 210 may store one or more of the NVMe data structures into CMB 212, including queues 304 such as submission queues (SQ), completion queues (CQ), physical page region (PRP) lists, scatter gather list (SGL) segments, write data, read data, and combinations thereof.

The NVMe protocol standard is based on a paired submission and completion queue mechanism. The host system 220 place commands into a submission queue (SQ), and the controller 215 place the completions of commands into the associated completion queue (CQ). The host system 220 may have multiple pairs of submission and completion queues for different types of commands. Responsive to a notification by the host system 220, the controller 215 fetches the command from the submission queue. Thereafter, the controller 215 processes the command, e.g., performs internal command selection, executes the command (such as performing a write or a read), and the like. After processing the command, the controller 215 places an entry in the completion queue, with the entry indicating that the execution of the command has completed. The controller 215 then generates an interrupt to the host device indicating that an entry has been placed on the completion queue. The host system 220 reviews the entry of the completion queue and then notifies the controller 215 that the entry of the completion queue has been reviewed.

In general, submission and completion queues are allocated within the host memory 205 where each queue might be physically located contiguously or non-contiguously in the host memory. However, the CXL-SSD device 210, which is supported in the NVMe standard, enables the host system 220 to place submission queues, completion queues, physical page region (PRP) lists, scatter gather list (SGL), and data buffers in the CMB 212 rather than in the host memory 205.

The controller 215 can include a CMB manager to classify received host write transactions to CMB 212. Host write or read transactions to CMB 212 may be associated with host write or read commands. In certain embodiments, controller 215 may classify the host write transactions into one of the three NVM data structure groups of NVMe queues 214, pointers 216, and data buffers 218. NVMe queues 214 include host submission queues (SQs) and host completion queues (CQs).

A Submission Queue (SQ) is a circular buffer with a fixed slot size that the host system 220 uses to submit commands for execution by the controller 215. The host system 220 updates the appropriate SQ Tail doorbell register when there are one or more new commands to execute. The previous SQ Tail value is overwritten in the controller 215 when there is a new doorbell register write. The controller 215 fetches SQ entries in order from the SQ, however, it may then execute those commands in any order. Each SQ entry is a command. The command is 64 bytes in size. The command, via Physical Region Page (PRP) entries, specifics a physical memory location in the host memory 205 to use for data transfer.

A Completion Queue (CQ) is a circular buffer with a fixed slot size used to post status for completed commands. A completed command is uniquely identified by a combination of the associated SQ identifier and command identifier that is assigned by the host system 220. Multiple SQ may be associated with a single CQ. The CQ head pointer is updated by host software after it has processed completion entries indicating the last free CQ entry. A phase (P) bit is defined in the completion entry to indicate whether an entry has been newly posted without consulting a register. This enables host software to determine whether the new entry was posted as part of the previous or current round of completion notifications. Specifically, each round through the Completion Queue locations, the controller inverts the phase bit.

Pointers 216 may include physical region pages (PRP) lists and scatter gather lists (SGLs). PRP lists contain pointers indicating physical memory pages populated with user data or going to be populated with user data, such as for read or write commands in NVMe queues 214. SGLs include pointers indicating the physical addresses of host memory 205 in which data should be transferred from for write commands and in which data should be transferred to for read commands. In some implementations, SGLs include pointers indicating the physical addresses of PBAM 226 which data should be transferred from for write commands and in which data should be transferred to for read commands. Data buffers 218 may contain user data to be written to CXL-SSD device 210 associated with a write command contain and/or user data to be read from CXL-SSD device 210 associated with a read command.

In certain embodiments, the controller 215 allows a particular command associated with NVMe queues 214, pointers 216, and data buffers 218 to store in CMB 212 to reduce command execution latency by the CXL-SSD device 210. For example, a host command entry written to SQs-implemented CMB 212 avoids fetching the host command entry through the PCIe fabric which may include multiple switches if the SQ is located in the host memory 205. PRP lists and SGLs written to CMB 212 of CXL-SSD device 210 avoid a separate fetch of the PRP lists and SGLs through the PCIe fabric if the PRP lists and SGLs are located in host memory 205. User data written to CMB 212 of CXL-SSD device 210 avoid having CXL-SSD device 210 fetch the user data from host memory 205.

The controller 215 may communicate through the host interface 218 with the host system 220 and components of the CXL-SSD device 210. The controller 215 may retrieve commands from SQ, handle the commands, and submit a completion notification to the CQs for the host system 220.

CXL-SSD device 210 includes a DRAM 222 that are used to store firmware control data (e.g., firmware control table). The DRAM 222 is volatile memories or cache buffer(s) for short-term storage or temporary memory during operation of CXL-SSD device 210. Volatile memories do not retain stored data if powered off. The DRAM generally requires periodic refreshing of stored data. In some implementations, the DRAM 222 does not store user data. In some implementations, the DRAM 222 is not byte-addressable by the host system 220, i.e., the address of the DRAM 222 is not accessible by the host system 220.

CXL-SSD device 210 includes NAND arrays 224. The NAND 224 are non-volatile memories that are used to store user data provided by the host system 220. The NAND 224 can include SLC blocks and other types of blocks such as TLC blocks. For example, user data can be written in SLC blocks first and when enough data have been written in SLC blocks, e.g., three SLC blocks, the user data in the SLC blocks can be folded into TLC blocks, e.g., one TLC block.

CXL-SSD device 210 includes PBAM arrays 226. The PBAM 226 are system-exposed byte addressable persistent memories alongside the block storage (e.g., NAND arrays 224) for a variety of implementations or use cases that can make use of transaction oriented persistent memory. The PBAM 226 are non-volatile memories that are used as an intermediate layer for storing the user data, where the user data will be transferred from and eventually stored in a recipient memory (e.g., NAND 224). The PBAM 226 are byte-addressable by the host system 220. i.e., the address of the PBAM 226 is directly accessible by the host system 220. The host system 220 can directly write or read in the PBAM 226. The granularity of bytes that can be written to or read from PBAM 226 is 64 bytes, which is much smaller than 16 KB granularity for NAND 224.

In some embodiments, the controller 215 further includes a PBAM manager 113 coupled to or integrated with the processors 217 and the host interface 218, as will be discussed in more detail. The PBAM manager 113 may be processing logic that can include hardware (e.g., processing device, circuitry, dedicated logic, programmable logic, microcode, hardware of a device, integrated circuit, etc.), firmware (e.g., instructions run or executed on the processors 217), or a combination thereof.

The PBAM manager 113 may retrieve commands from SQ, handle the commands by using the PBAM 226, and submit a completion notification to the CQs for the host system 220. The commands can be different types, including NVMe write/read commands, or CXL.mem write/read commands. As illustrated below, FIG. 3 describes the operations of the PBAM manager 113 (and/or controller 215) for NVMe write/read commands, while FIG. 4 describes the operations of the PBAM manager 113 (and/or controller 215) for CXL.mem write/read commands. In some implementations, the PBAM manager 113 can determine whether a received command is a an NVMe command or a CXL.mem command. Responsive to determining that the received command is a an NVMe command, the PBAM manager 113 may proceed with operations illustrated with respect to FIG. 3. Responsive to determining that the received command is a CXL.mem command the PBAM manager 113 may proceed with operations illustrated with respect to FIG. 4.

Figure 3:
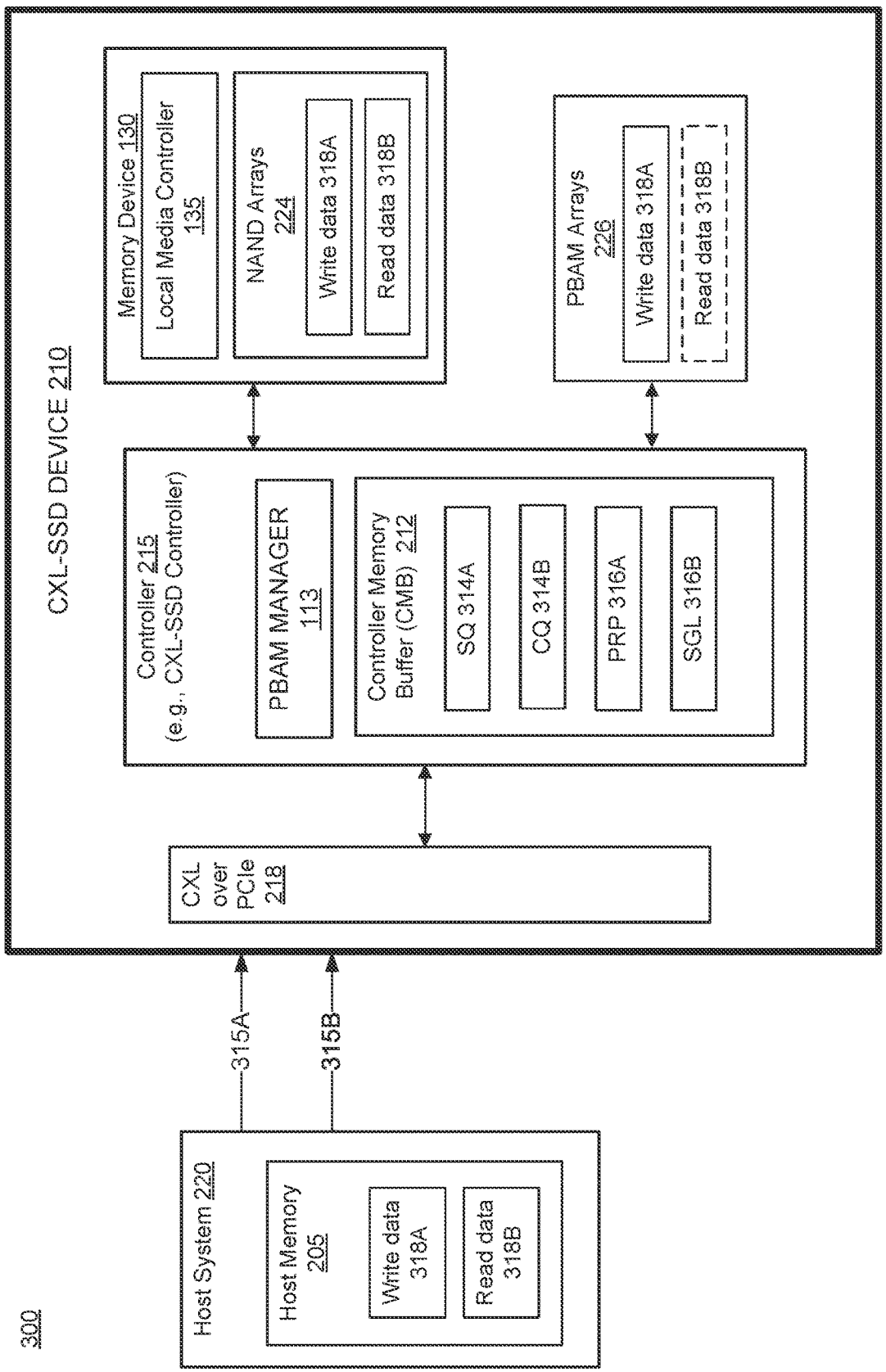
FIG. 3 illustrates an example of using a persistent byte-addressable memory (PBAM) in a compute express link solid-state drive (CXL-SSD) device for non-volatile memory express (NVMe) commands in accordance with some embodiments of the present disclosure.

Referring to FIG. 3, the host system 220 can send a NVMe write command 315A to write user data in the NAND 224. The host system 220 can send the NVMe write command 315A to the controller 215 by placing the NVMe write command 315A in a SQ 314A. The controller 215 (e.g., via the PBAM manager 113) fetches the NVMe write command 315A from SQ 314A and executes the NVMe write command 315A by writing the user data 318A specified in the NVMe write command ("write data") in the PBAM 226. Writing data in the PBAM 226 may involve writing a portion of data in any available space continuously or un-continuously in the PBAM 226. Writing data in the PBAM 226 is performed in a data granularity of a small size (e.g., 64 bytes). The granularity of data size for writing in the PBAM 226 is smaller than the granularity of data size for writing in the NAND 224. Specifically, user data 318A is packaged in X-bytes (e.g., 64-byte) packets (i.e., chunks), and the controller 215 writes packet-by-packet in the PBAM 226. In some implementations, the host system 220 may send messages including the physical memory addresses of user data 318A stored in the host memory 205 to the controller 215, and the controller 215 may access the user data 318A by the physical memory addresses and store the user data 318A in the PBAM 226. In some implementations, power loss may happen when writing the user data 318A in the PBAM 226, for example, when a specific chunk of data is in transfer. In such cases, the specific chuck of data will not be stored in the PBAM 226, however, because of the small size of the chuck of data, the system recovery after the power up can be efficient in that only the small size of the chuck of data needs to be rewritten.

In some embodiments, after writing data in the PBAM 226, the controller 215 (e.g., via the PBAM manager 113) may updates the SGL 316B used for the PBAM 226 so that the user data 318A can be pointed to the corresponding addresses of the PBAM 226. After certain amount of data has been stored in the PBAM 226 for the NVMe write command 315A, the controller 215 may write the data that has been stored in the PBAM 226 to the NAND 224. In some implementations, the controller 215 may use the SGL 316B to access the user data 318B stored in the PBAM 226 and store it in the NAND 224. Writing data in the NAND 224 is performed in a granularity of a large size (e.g., 16 KB). For example, 256 chunks (e.g., pages) of data stored in the PBAM 226 can be written to one chunk (e.g., page) of data in the NAND 224. In some implementations, power loss may happen when writing the user data 318A in the NAND 224. In such cases, because the user data 318A is stored in the persistent memory, the controller 215 can, after the power up, re-transfer the affected user data 318A from the PBAM 226 to the NAND 224 without the need to interact with the host system 220.

The controller 215 (e.g., via the PBAM manager 113) may continue the process of writing data in the PBAM arrays 326 and then transferring the PBAM arrays 326 to the NVM arrays 324 until writing the user data 316 A specified in the NVMe write command 315A is completed. The controller may write an entry in the CQ 314B indicating that the NVMe write command 315A has been executed.

Referring to FIG. 3, the host system 220 can send a NVMe read command 315B to read data from the NAND 224. The host system 220 can send the NVMe read command 315B to the controller 215 by placing the NVMe read command 315B in a SQ 314A. The controller 215 (e.g., via the PBAM manager 113) fetches the NVMe read command 315B from SQ 314A and executes the NVMe read command 315B by reading the user data 318B specified in the NVMe write command ("read data") from the NAND 224. In some implementations, reading data from the NAND 224 may involve writing a portion of data in any available space continuously or un-continuously in the host memory 205. In some implementations, reading data from the NAND arrays 224 may involve writing a portion of data in any available space continuously or un-continuously in the PBAM 226 so that the user data 318B can be used by the host system 220 for other operations. As described above, writing data in PBAM 226 is performed in a data granularity of a small size (e.g., 64 bytes). Specifically, user data 318B is packaged in Y-bytes (e.g., 64-byte) packets (i.e., chunks), and the controller 215 writes packet-by-packet in the PBAM 226. In some implementations, power loss may happen when writing the user data 318B in the PBAM 226, for example, when a specific chunk of data is in transfer. In such cases, the specific chuck of data will not be stored in the PBAM 226, however, because of the small size of the chuck of data, the system recovery after the power up can be efficient in that only the small size of the chuck of data needs to be rewritten.

The controller 215 may continue the process of writing data in the host memory 205 or the PBAM arrays 326 until reading the user data 316B specified in the NVMe read command 315B is completed. The controller may write an entry in the CQ 314B indicating that the NVMe read command 315B has been executed.

Figure 4:
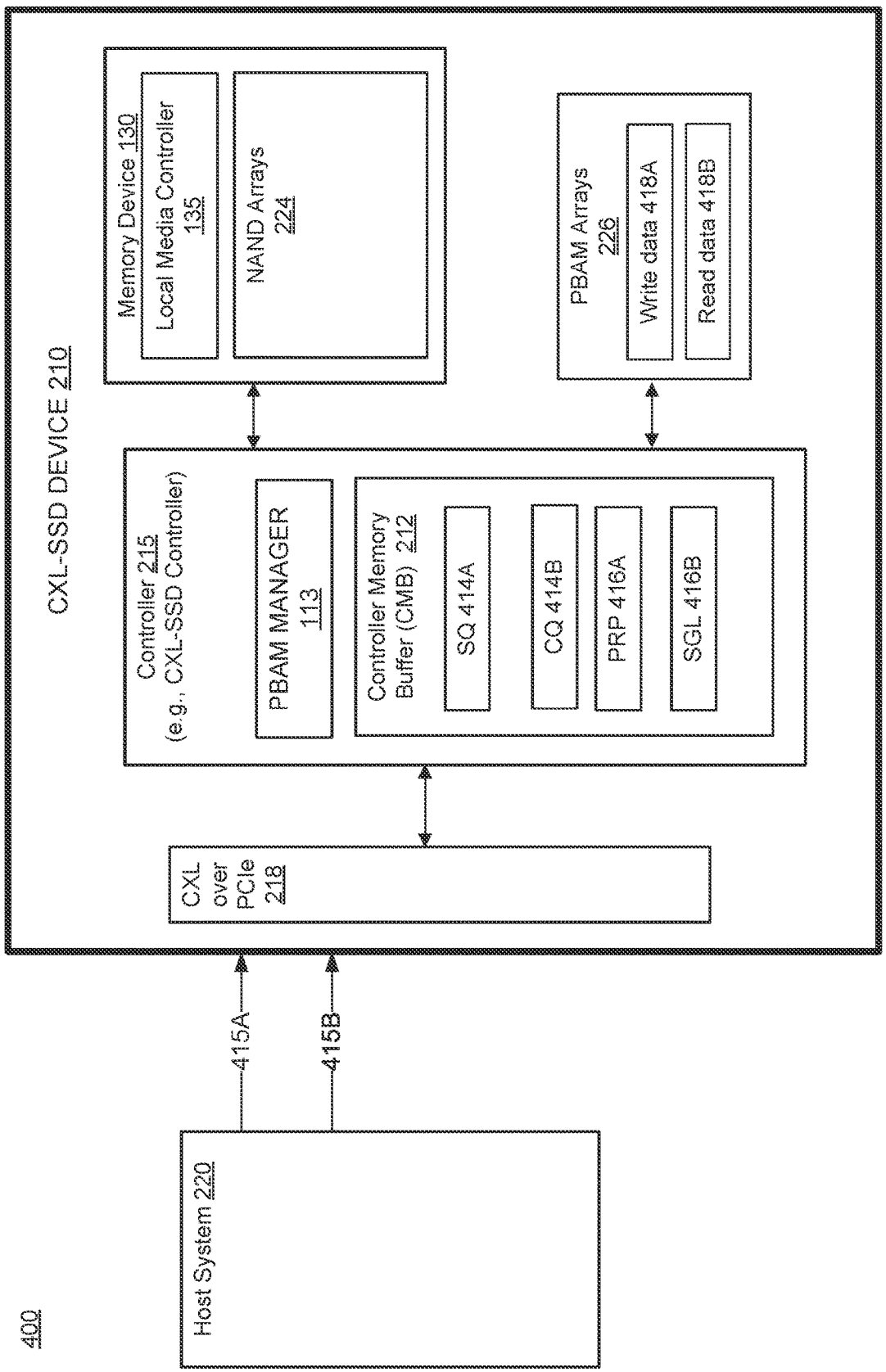
FIG. 4 illustrates an example of using a persistent byte-addressable memory (PBAM) in a compute express link solid-state drive (CXL-SSD) device for CXL.mem commands in accordance with some embodiments of the present disclosure.

Referring to FIG. 4, the host system 220 can send a CXL.mem write command 415A to write user data in the PBAM 326. The host system 220 can send the CXL.mem write command 415A to the controller 215 by placing the CXL.mem write command 415A in a SQ 414A. The controller 215 fetches the CXL.mem write command 315A from SQ 414A and executes the CXL.mem write command 415A by writing the user data 418A specified in the CXL.mem write command ("write data") in the PBAM 226. Writing data in PBAM 226 may involve writing a portion of data in any available space continuously or un-continuously in the PBAM 226. Writing data in PBAM 226 is performed in a granularity of a small size (e.g., 64 bytes). The granularity of data size for writing in the PBAM 226 is smaller than the granularity of data size for writing in the NAND 224. Specifically, user data 418A is packaged in M-bytes (e.g., 64-byte) packets (i.e., chunks), and the controller 215 writes packet-by-packet in the PBAM 226. In some implementations, power loss may happen when writing the user data 418A in the PBAM 226, for example, when a specific chunk of data is in transfer. In such cases, the specific chuck of data will not be stored in the PBAM 226, however, because of the small size of the chuck of data, the system recovery after the power up can be efficient in that only the small size of the chuck of data needs to be rewritten. The controller 215 (e.g., via the PBAM manager 113) may continue the process of writing data in the PBAM arrays 226 until writing the user data 416A specified in CXL.mem write command 415A is completed. The controller may write an entry in the CQ 414B indicating that the CXL.mem write command 415A has been executed.

Referring to FIG. 4, the host system 220 can send a CXL.mem read command 415B to read data from PBAM 226. The host system 220 can send the CXL.mem read command 415B to the controller 215 by placing the CXL.mem read command 415B in a SQ 314A. The controller 215 (e.g., via the PBAM manager 113) fetches the CXL.mem read command 415B from SQ 314A and executes the CXL.mem read command 415B by reading the user data 318B specified in the CXL.mem read command ("read data") from the PBAM arrays 226. Reading data from the PBAM 226 is performed in a data granularity of a small size (e.g., 64 bytes). Specifically, user data 418B is packaged in N-bytes (e.g., 64-byte) packets (i.e., chunks), and the controller 215 reads packet-by-packet from the PBAM 226. In some implementations, power loss may happen when reading the user data 418B from the PBAM 226, for example, when a specific chunk of data is in transfer. In such cases, the specific chuck of data will not be received by the host system 220, however, because of the small size of the chuck of data, the system recovery after the power up can be efficient in that only the small size of the chuck of data needs to be reread. The controller 215 may continue the process of reading data from the PBAM arrays 226 until reading the user data 316B specified in the CXL.mem read command 415B is completed. The controller may write an entry in the CQ 414B indicating that the NVMe read command 315B has been executed.

In the above cases illustrated in FIGS. 3 and 4, after the user data stored in the PBAM 226 has been used by the host system 220, for example, transferred to a recipient memory indicated by the host system 220, the PBAM manager 113 can free the memory space used for storing the user data in the PBAM so that the memory space in the PBAM can be used for other operations.

Figure 5:
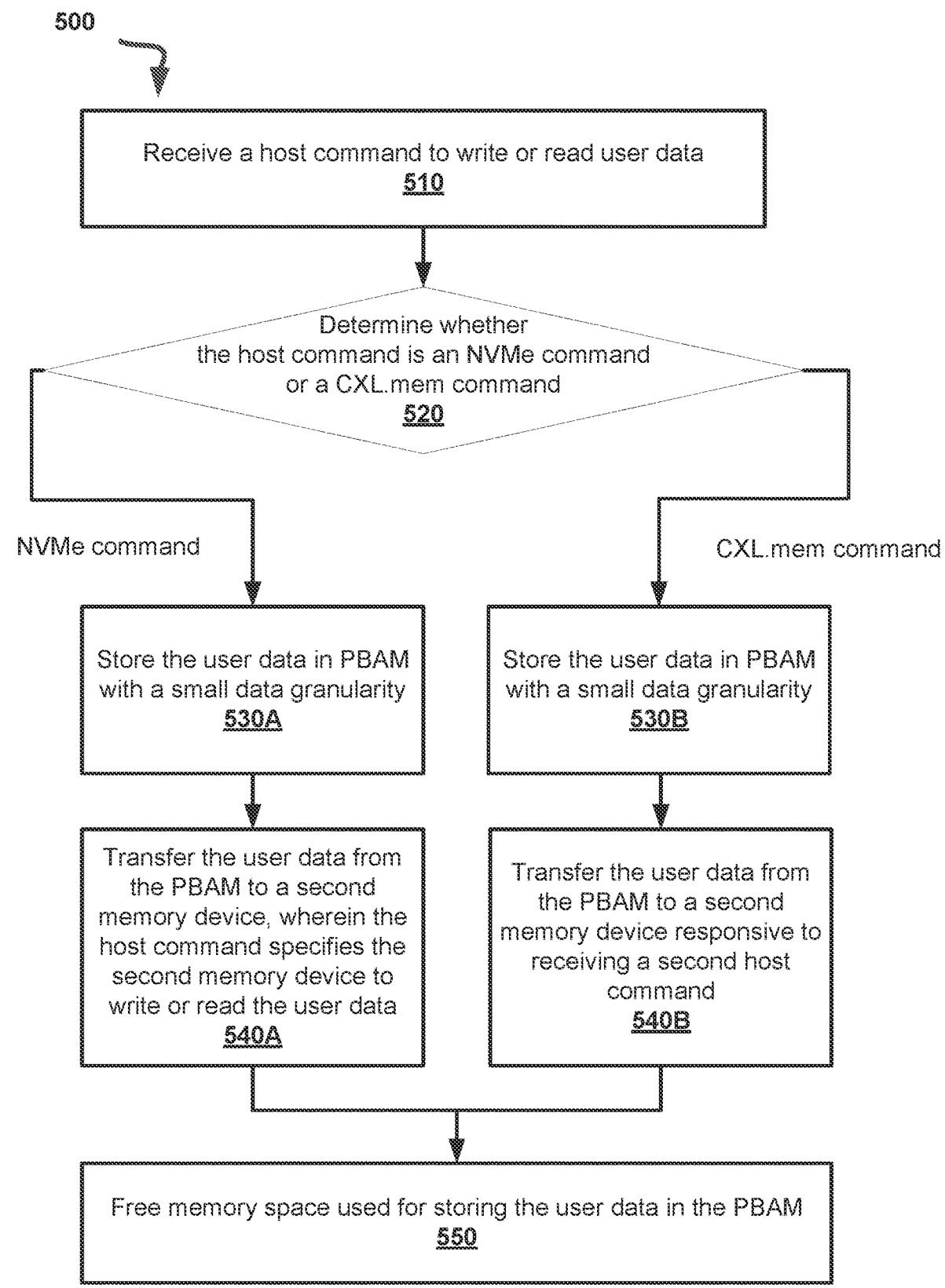
FIG. 5 is a flow diagram of an example method for using a persistent byte-addressable memory (PBAM) in a compute express link solid-state drive (CXL-SSD) device in accordance with some embodiments of the present disclosure.

FIG. 5 is a flow diagram of an example method 500 for using a persistent byte-addressable memory in a compute express link (CXL) memory device for efficient power loss recovery, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the PBAM manager 113 of FIG. 1 or the controller 215 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can receive a host command to write or read user data. In some implementations, the processing logic can receive a first host command via the CXL.mem protocol. In some implementations, the processing logic can receive the first host command via the CXL.io protocol.

The processing logic can be part of a compute express link (CXL) enabled non-volatile memory express solid-state drive (NVMe SSD), which supports a first protocol and a second protocol of an interface standard. The first protocol of the interface standard exposes a non-volatile memory of the second memory device to a host system, and the second protocol of the interface standard exposes the persistent byte-addressable memory of the first memory device to the host system. The first protocol and the second protocol are alternate protocols supported by peripheral component interconnect express (PCIe), wherein the interface standard is compute express link (CXL), wherein the first protocol is a CXL.io protocol, and wherein the second protocol is a CXL.mem protocol.

At operation 520, the processing logic can determine whether the host command is an NVMe command or a CXL.mem command.

At operation 530A, responsive to determining that the processing logic is an NVMe command, the processing logic can store the user data in PBAM (or a first memory device comprising the PBAM) with a small data granularity. At operation 540A, the processing logic can transfer the user data from the PBAM to a second memory device, where the first host command specifies the second memory device to write or read the user data. In some implementations, for data transfer, the processing logic can use a scatter gather list to obtain a physical address of the user data in the first memory device.

At operation 530B, responsive to determining that the processing logic is a CXL.mem command, the processing logic can store the user data in PBAM (or a first memory device comprising the PBAM) with a small data granularity. At operation 540B, the processing logic can transfer the user data from the PBAM to a second memory device responsive to receiving a second host command, where transmitting the user data stored in the first memory device to the second memory device is performed responsive to a second host command. In some implementations, for data transfer, the processing logic can use a scatter gather list to obtain a physical address of the user data in the first memory device.

In some implementations, responsive to determining that a power loss has happened during storing a particular data packet in a size of the first data granularity in the first memory device, the processing logic can determine whether the first host command associated with the particular data packet is completely executed; and responsive to determining that the first host command is not completely executed, the processing logic can restore the particular data packet in the first memory device.

At operation 550, responsive to transmitting the user data stored in the first memory device to the second memory device, the processing logic can free memory space used for storing the user data in the PBAM (or the first memory device comprising the PBAM).

Figure 6:
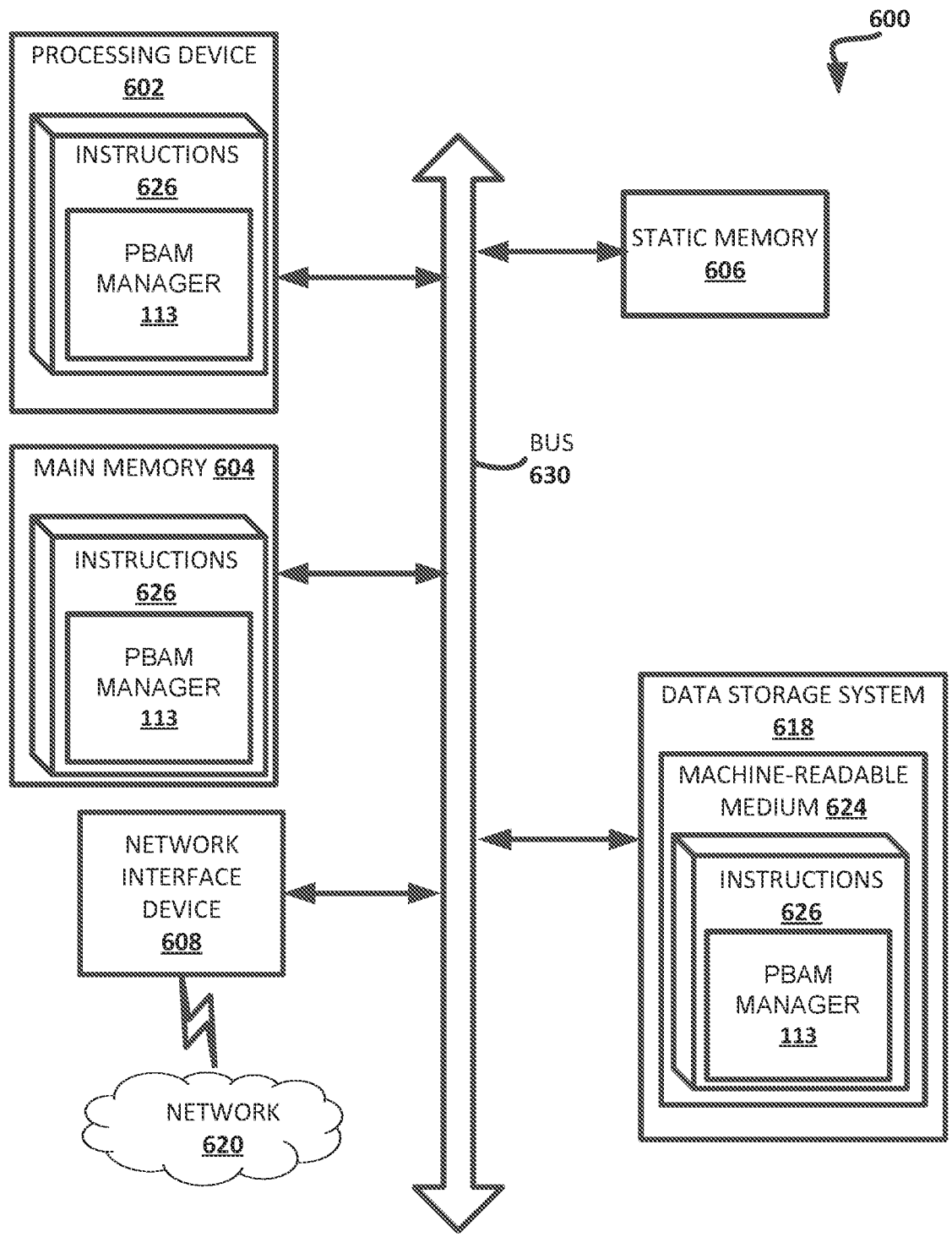
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the PBAR manager 113 of FIG. 1 or the controller 215 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an APL management component (e.g., the PBAR manager 113 of FIG. 1 or the controller 215 of FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a first memory device comprising a persistent byte-addressable memory;
   a second memory device; and
   a processing device, operatively coupled with the first and second memory devices, to perform operations comprising:
   receiving a first host command to write or read user data;
   storing the user data in the persistent byte-addressable memory with a first data granularity; and
   transmitting the user data stored in the persistent byte-addressable memory to the second memory device according to the first host command, wherein the first host command comprises at least one of a non-volatile memory express (NVMe) command or a compute express link (CXL).mem command.

2. The system of claim 1, wherein the processing device is to perform operations further comprising:
   responsive to determining that a power loss event has occurred during an operation to a particular data packet in a size of the first data granularity in the persistent byte-addressable memory, determining whether the first host command associated with the particular data packet is completely executed; and
   responsive to determining that the first host command is not completely executed, restoring the particular data packet in the persistent byte-addressable memory.

3. The system of claim 1, wherein the first data granularity is less than a data granularity associated with a not-and (NAND) type flash memory.

4. The system of claim 1, wherein the processing device is associated with a compute express link (CXL) enabled non-volatile memory express solid-state drive (NVMe SSD).

5. The system of claim 1, wherein the system supports a first protocol and a second protocol of an interface standard, wherein the first protocol of the interface standard exposes a non-volatile memory of the second memory device to a host system, and the second protocol of the interface standard exposes the persistent byte-addressable memory of the first memory device to the host system.

6. The system of claim 5, wherein the first protocol and the second protocol are alternate protocols supported by peripheral component interconnect express (PCIe), wherein the interface standard is compute express link (CXL), wherein the first protocol is a CXL.io protocol, and wherein the second protocol is a CXL.mem protocol.

7. The system of claim 6, wherein receiving the first host command is performed via the CXL.mem protocol, and wherein transmitting the user data stored in the first memory device to the second memory device is performed responsive to a second host command.

8. The system of claim 6, wherein receiving the first host command is performed via the CXL.io protocol, and wherein the first host command specifies the second memory device to write or read the user data.

9. The system of claim 1, wherein the processing device is to perform operations further comprising:
   determining whether the first host command is the non-volatile memory express (NVMe) command or the compute express link (CXL).mem command.

10. The system of claim 1, wherein the processing device is to perform operations further comprising:
    responsive to transmitting the user data stored in the persistent byte-addressable memory to the second memory device, freeing memory space used for storing the user data in the persistent byte-addressable memory.

11. The system of claim 1, wherein transmitting the user data stored in the persistent byte-addressable memory to the second memory device comprises:
    using a scatter gather list to obtain a physical address of the user data in the persistent byte-addressable memory.

12. A method comprising:
    receiving, by a processing device, a first host command to write or read user data;
    storing the user data in a persistent byte-addressable memory with a first data granularity;
    transmitting the user data stored in the persistent byte-addressable memory of a first memory device to a second memory device according to the first host command, wherein the first host command comprises at least one of a non-volatile memory express (NVMe) command or a compute express link (CXL).mem command; and
    responsive to transmitting the user data stored in the persistent byte-addressable memory to the second memory device, freeing memory space used for storing the user data in the persistent byte-addressable memory.

13. The method of claim 12, further comprising:
    responsive to determining that a power loss event has occurred during an operation to a particular data packet in a size of the first data granularity in the persistent byte-addressable memory, determining whether the first host command associated with the particular data packet is completely executed; and
    responsive to determining that the first host command is not completely executed, restoring the particular data packet in the persistent byte-addressable memory.

14. The method of claim 12, wherein the first data granularity is less than a data granularity associated with a not-and (NAND) type flash memory.

15. The method of claim 12, wherein the processing device comprises a compute express link (CXL) enabled non-volatile memory express solid-state drive (NVMe SSD).

16. The method of claim 15, wherein the processing device supports a first protocol and a second protocol of an interface standard, wherein the first protocol of the interface standard exposes a non-volatile memory of the second memory device to a host system, and the second protocol of the interface standard exposes the persistent byte-addressable memory of the first memory device to the host system.

17. The method of claim 16, wherein the first protocol and the second protocol are alternate protocols supported by peripheral component interconnect express (PCIe), wherein the interface standard is compute express link (CXL), wherein the first protocol is a CXL.io protocol, and wherein the second protocol is a CXL.mem protocol.

18. The method of claim 17, wherein receiving the first host command is performed via the CXL.mem protocol, and wherein transmitting the user data stored in the persistent byte-addressable memory to the second memory device is performed responsive to a second host command.

19. The method of claim 17, wherein receiving the first host command is performed via the CXL.io protocol, and wherein the first host command specifies the second memory device to write or read the user data.

20. A non-transitory computer-readable storage medium comprising instructions that, when executed by a processing device, cause the processing device to perform operations comprising:

receiving a first host command to write or read user data;

storing the user data in a persistent byte-addressable memory with a first data granularity, wherein the first data granularity is less than a data granularity associated with a not-and (NAND) type flash memory;

transmitting the user data stored in the persistent byte-addressable memory to a second memory device according to the first host command, wherein the first host command comprises at least one of a non-volatile memory express (NVMe) command or a compute express link (CXL).mem command; and responsive to transmitting the user data stored in the persistent byte-addressable memory to the second memory device, freeing memory space used for storing the user data in the persistent byte-addressable memory.

* * * * *